(12) United States Patent
Miller, III

(10) Patent No.: US 11,894,668 B2
(45) Date of Patent: *Feb. 6, 2024

(54) SYSTEM AND METHOD FOR DISCERNING ARCING IN ELECTRICAL WIRING

(71) Applicant: Hubbell Incorporated, Shelton, CT (US)

(72) Inventor: William Vernon Miller, III, Aldie, VA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,789

(22) Filed: Nov. 16, 2021

(65) Prior Publication Data

US 2022/0085597 A1 Mar. 17, 2022

Related U.S. Application Data

(63) Continuation of application No. 16/520,679, filed on Jul. 24, 2019, now Pat. No. 11,183,831.

(60) Provisional application No. 62/703,127, filed on Jul. 25, 2018.

(51) Int. Cl.
*H02H 1/04* (2006.01)
*H02H 3/10* (2006.01)
*H02H 3/33* (2006.01)
*H02H 1/00* (2006.01)

(52) U.S. Cl.
CPC .......... *H02H 1/043* (2013.01); *H02H 1/0015* (2013.01); *H02H 3/10* (2013.01); *H02H 3/33* (2013.01)

(58) Field of Classification Search
CPC ........ H02H 1/04; H02H 1/043; H02H 1/0015; H02H 3/10; H02H 3/33
See application file for complete search history.

(56) References Cited

U.S. PATENT DOCUMENTS

| 7,268,989 B2 | 9/2007 | Parker et al. |
| 7,864,492 B2 | 1/2011 | Restrepo et al. |
| 2006/0274460 A1 | 12/2006 | Zuercher |
| 2007/0086124 A1 | 4/2007 | Elms |
| 2008/0020627 A1 | 1/2008 | Sexton |

(Continued)

OTHER PUBLICATIONS

PCT/US2019/043165 International Search Report and Written Opinion dated Oct. 18, 2019.

*Primary Examiner* — Fred E Finch, III
(74) *Attorney, Agent, or Firm* — Michael Best & Friedrich LLP

(57) ABSTRACT

A wiring device including an interrupting device and a controller. The interrupting device electrically connecting one or more line terminals to one or more load terminals when the interrupting device is in a reset condition and disconnecting the line terminals from the load terminals when the interrupting device is in a tripped condition. The controller has an electronic processor and a memory. The controller is configured to monitor a current of the one or more line terminals, identify a presence of an in-rush condition, wherein an in-rush of the current exists when the one or more cycles of current conform with a decay progression envelope, and prevent the tripped condition upon identifying the in-rush condition.

7 Claims, 18 Drawing Sheets

(56) References Cited

U.S. PATENT DOCUMENTS

| | | | |
|---|---|---|---|
| 2008/0204950 A1* | 8/2008 | Zhou | H02H 1/0015 |
| | | | 361/42 |
| 2010/0033888 A1* | 2/2010 | Dougherty | G01R 31/54 |
| | | | 702/58 |
| 2010/0066381 A1 | 3/2010 | Mousavi | |
| 2010/0165521 A1 | 7/2010 | Changali | |
| 2010/0324845 A1 | 12/2010 | Spanier | |
| 2012/0098672 A1 | 4/2012 | Restrepo et al. | |
| 2012/0229939 A1 | 9/2012 | Mikani et al. | |
| 2014/0078622 A1 | 3/2014 | Crane | |
| 2018/0083434 A1* | 3/2018 | Lim | H02H 3/044 |
| 2018/0083436 A1* | 3/2018 | Chen | H02H 3/16 |
| 2020/0011908 A1 | 1/2020 | Bickel | |

* cited by examiner

SYSTEM AND METHOD FOR DISCERNING ARCING IN ELECTRICAL WIRING

RELATED APPLICATIONS

This application claims priority to U.S. patent application Ser. No. 16/520,679, filed Jul. 24, 2019, which claims priority to U.S. Provisional Patent Application No. 62/703,127, filed on Jul. 25, 2018, the entire contents of both of which are incorporated herein by reference.

FIELD

Embodiments relate to switched electrical devices.

SUMMARY

Switched electrical devices, such as but not limited to circuit interrupting device (for example, ground fault circuit interrupters (GFCI) and/or arc fault circuit interrupters (AFCI)) are configured to switch to a "tripped" or unlatched state from a "reset" or latched state when one or more conditions are detected. In some situations, arcing may manifest itself in the form of an impulse condition and/or a volatility condition. In such a situation, tripping may be used. In other situations, a normally operating load may mimic arcing when it is first energized and arcing could erroneously be detected as a result of the in-rush condition. In yet other situations, a load operating normally under steady-state conditions may also mimic arcing. Thus, in such situations, tripping is unwarranted.

Thus, one embodiment provides a wiring device including an interrupting device and a controller. The interrupting device electrically connects one or more line terminals to one or more load terminals when the interrupting device is in a reset condition and disconnecting the line terminals from the load terminals when the interrupting device is in a tripped condition. The controller has an electronic processor and a memory. The controller is configured to monitor a current of the one or more line terminals, identify a presence of an in-rush condition, wherein an in-rush of the current exists when the one or more cycles of current conform with a decay progression envelope, and prevent the tripped condition upon identifying the in-rush condition.

Another embodiment provides a wiring device including an interrupting device and a controller. The interrupting device electrically connects one or more line terminals to one or more load terminals when the interrupting device is in a reset condition and disconnecting the line terminals from the load terminals when the interrupting device is in a tripped condition. The controller has an electronic processor and a memory. The controller is configured to monitor a current of the one or more line terminals, identify a presence of a steady-state condition, wherein a steady-state of the current exists when the one or more cycles of current conform to both a range of allowable variation in RMS value and an envelope of acceptable variation in correlation coefficient value, and prevent the tripped condition upon identifying the steady-state condition.

Another embodiment provides a wiring device including an interrupting device and a controller. The interrupting device electrically connects one or more line terminals to one or more load terminals when the interrupting device is in a reset condition and disconnecting the line terminals from the load terminals when the interrupting device is in a tripped condition. The controller has an electronic processor and a memory. The controller is configured to monitor a current of the one or more line terminals, identify a presence of an impulse condition, wherein the impulse condition is identified by determining a root-mean-square (RMS) value of at least one cycle of the current of the one or more line terminals, and place the interrupting device in the tripped condition upon identifying the impulse condition.

Another embodiment provides a wiring device including an interrupting device and a controller. The interrupting device electrically connects one or more line terminals to one or more load terminals when the interrupting device is in a reset condition and disconnecting the line terminals from the load terminals when the interrupting device is in a tripped condition. The controller has an electronic processor and a memory. The controller is configured to monitor a current of the one or more line terminals, identify a presence of a volatility condition, wherein the volatility condition is identified by determining a root-mean-square (RMS) value of at least one cycle of the current of the one or more line terminals, and place the interrupting device in the tripped condition upon identifying at least one selected from the group consisting of the impulse condition and the volatility condition.

Other aspects of embodiments detailed below will become apparent by consideration of the detailed description and accompanying drawings.

DETAILED DESCRIPTION

Before any embodiments are explained in detail, it is to be understood that the application is not limited in its application to the details of construction and the arrangement of components set forth in the following description or illustrated in the following drawings. Other embodiments, than those described below, are capable of being practiced or of being carried out in various ways.

Figure 1:
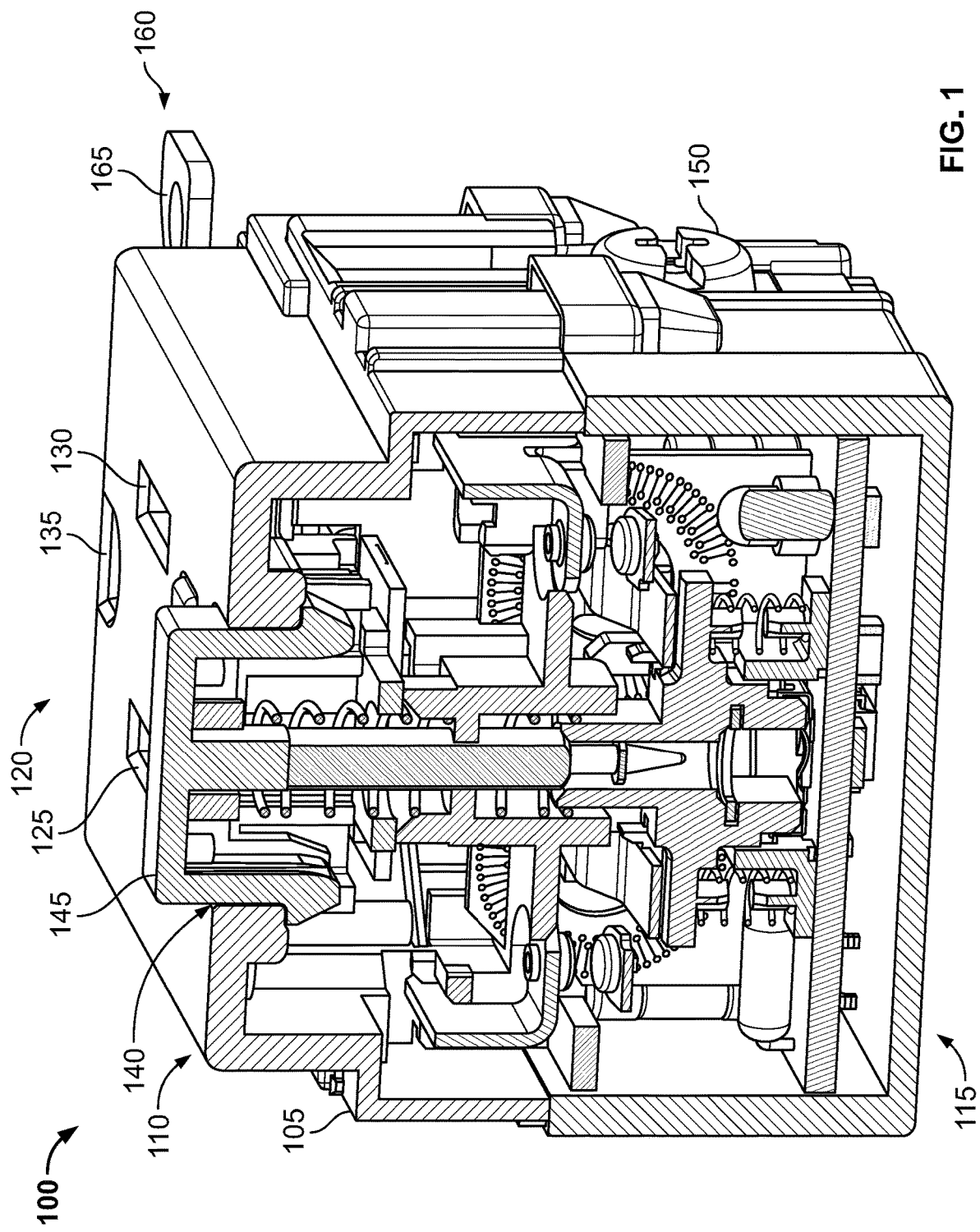
FIG. 1 is a perspective cutaway view of a receptacle 1000 according to some embodiments.

FIG. 1 is a perspective cutaway view of a receptacle 1000 including a circuit interrupting device according to some embodiments. The receptacle 1000 includes a housing 105 having a front cover 110 and a rear cover 115. The housing 105 may be formed of plastic, or a similar material.

The front cover 110 may include a duplex outlet face 120 with a phase opening 125, a neutral opening 130, and a ground opening 135. The face 120 may further include an opening 140 accommodating a RESET button 145. Although not illustrated, in some embodiments, the face 120 may include additional openings to accommodate additional buttons (for example, a TEST button), as well as additional openings to accommodate various indicators (for example, light-emitting diodes (LEDs), buzzers, etc.). The rear cover 115 is secured to the front cover 110 and may include one or more terminal screws 150. In some embodiments, the terminal screws 150 include a line terminal screw, a neutral terminal screw, and/or a ground terminal screw. Contained within the front and rear covers 110, 115 is a manifold 155. Manifold 155 provides support for a yoke/bridge assembly 165 configured to secure the device 100 to an electrical box.

Figure 2A:
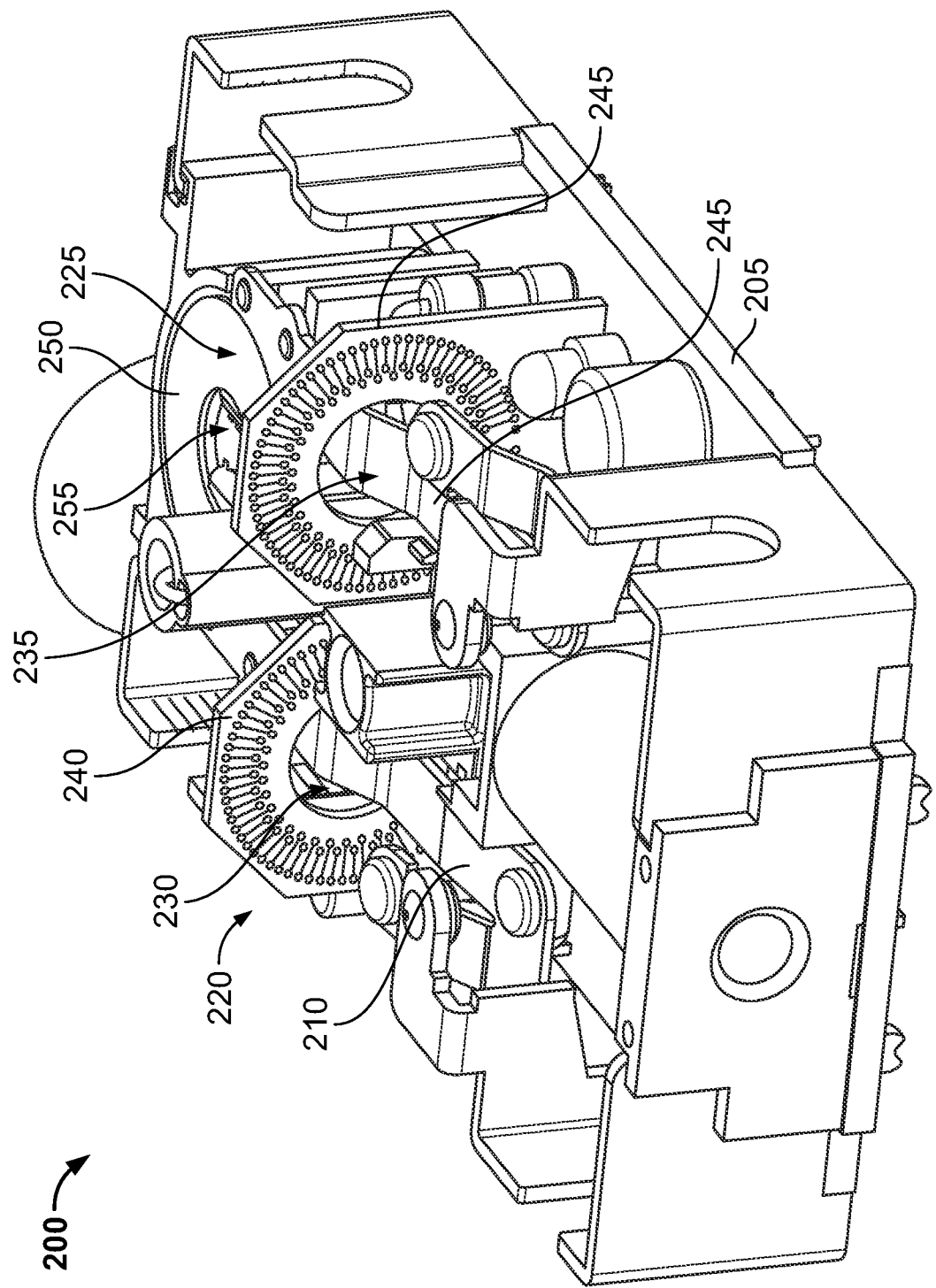
FIGS. 2A and 2B are perspective views of a core assembly of the circuit interrupting device of FIG. 1 according to some embodiments
Figure 2B:
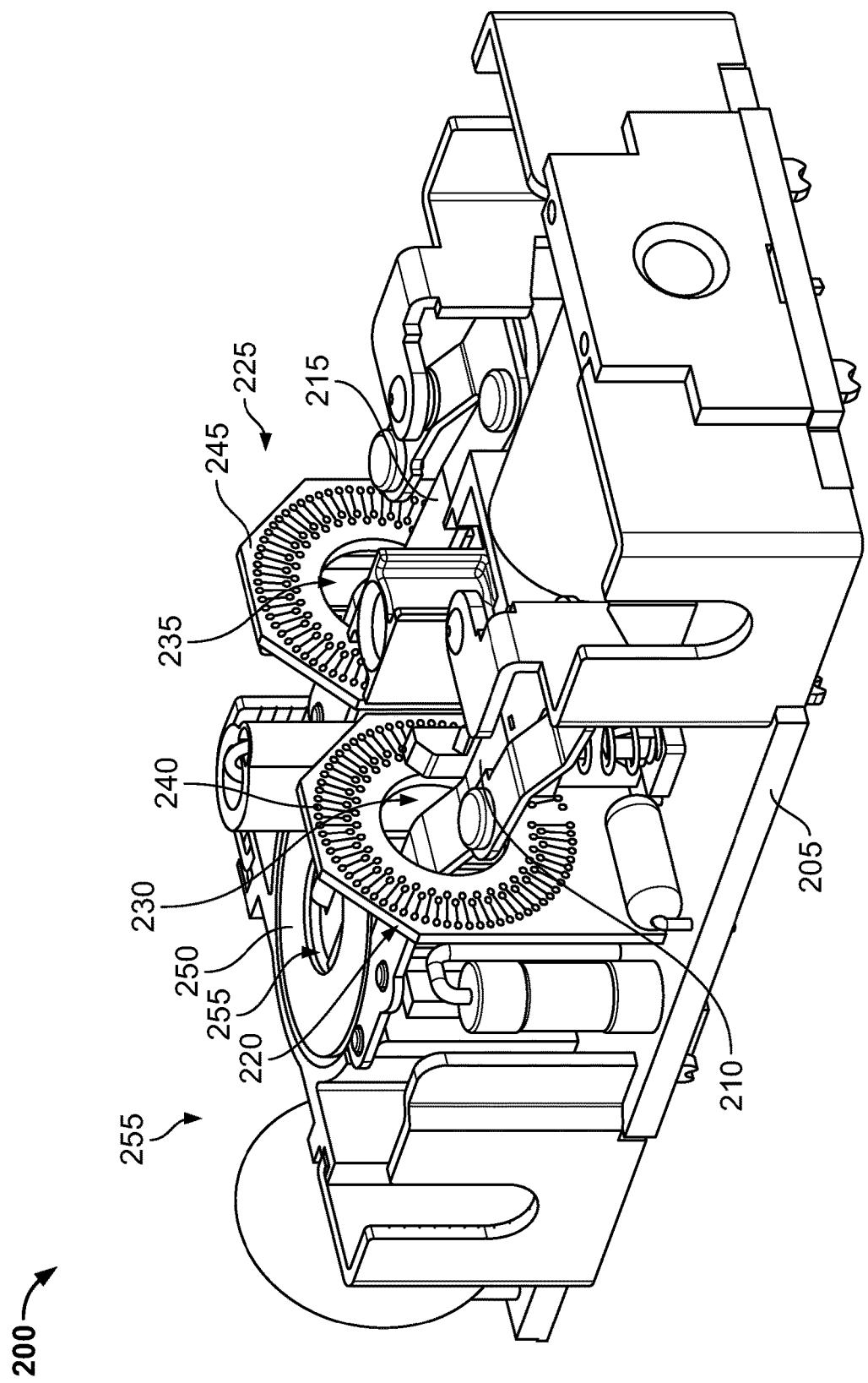

FIGS. 2A and 2B illustrate perspective views of a core assembly 200 according to some embodiments. The core assembly 200 is configured to support a printed circuit board 205 that supports most of the working components of the device 100, including the control system 400 illustrated in FIG. 4. The core assembly 200 further supports a line conductor 210 and a neutral conductor 215. The line and neutral conductors 210, 215 are respectively electrically connected to the line terminal and neutral terminal, and are configured to supply electrical power to the device 100.

The core assembly 200 may further support a first coil 220 and a second coil 225. As illustrated, the first and second coils 220, 225 may respectively include first and second apertures 230, 235. In some embodiments, the first aperture 230 is configured to receive the line conductor 210, while the second aperture 235 is configured to receive the neutral conductor 215. In some embodiments, the first and second coils 220, 225 may respectively be embedded into first and second printed circuit boards 240, 245. In other embodiments, the first and second coils 220, 225 may be embedded into a single printed circuit board.

The core assembly 200 may additionally support a third coil 250 having a third aperture 255. In some embodiments, the third aperture 255 is configured to receive both the line conductor 210 and the neutral conductor 215.

Figure 3:
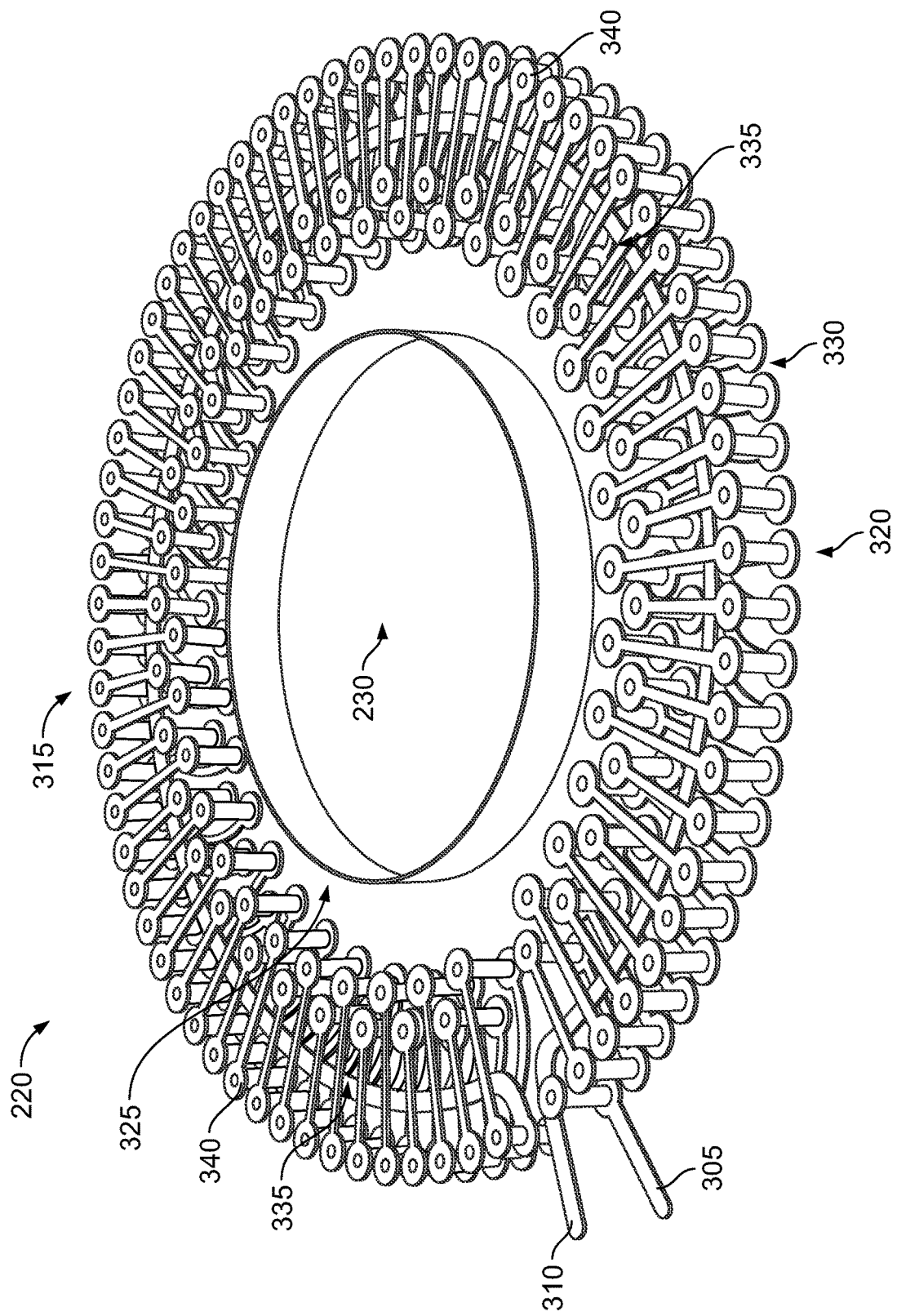
FIG. 3 is a perspective view of a coil of the circuit interrupting device of FIG. 1 according to some embodiments.

FIG. 3 illustrates one embodiment of the first coil 220 with the printed circuit board removed for illustrative purposes. As illustrated, the first coil 220 may be a Rogowski coil having an input 305 and an output 310. As illustrated, the coil 220 further includes an upper portion 315, a lower portion 320, an inner portion 325, an outer portion 330, a plurality of helical conductors 335, and a plurality of nodes 340, connecting the input 305 to the output 310. As illustrated, the helical conductors 335, along with the nodes 340, form the coil 220. For example, the plurality of conductors 335 form a portion of the coil 220 between the inner portion 325 and the outer portion 330, while the plurality of nodes 340 form the coil 220 between the upper portion 315 and the lower portion 320.

In some embodiments, the second coil 225 is also Rogowski coil, similar to coil 220. Although not illustrated, in some embodiments the third coil 250 may also be a Rogowski coil embedded on a printed circuit board (for example a third printed circuit board or a single printed circuit board including the first, second, and third coils 220, 225, 250.

Figure 4:
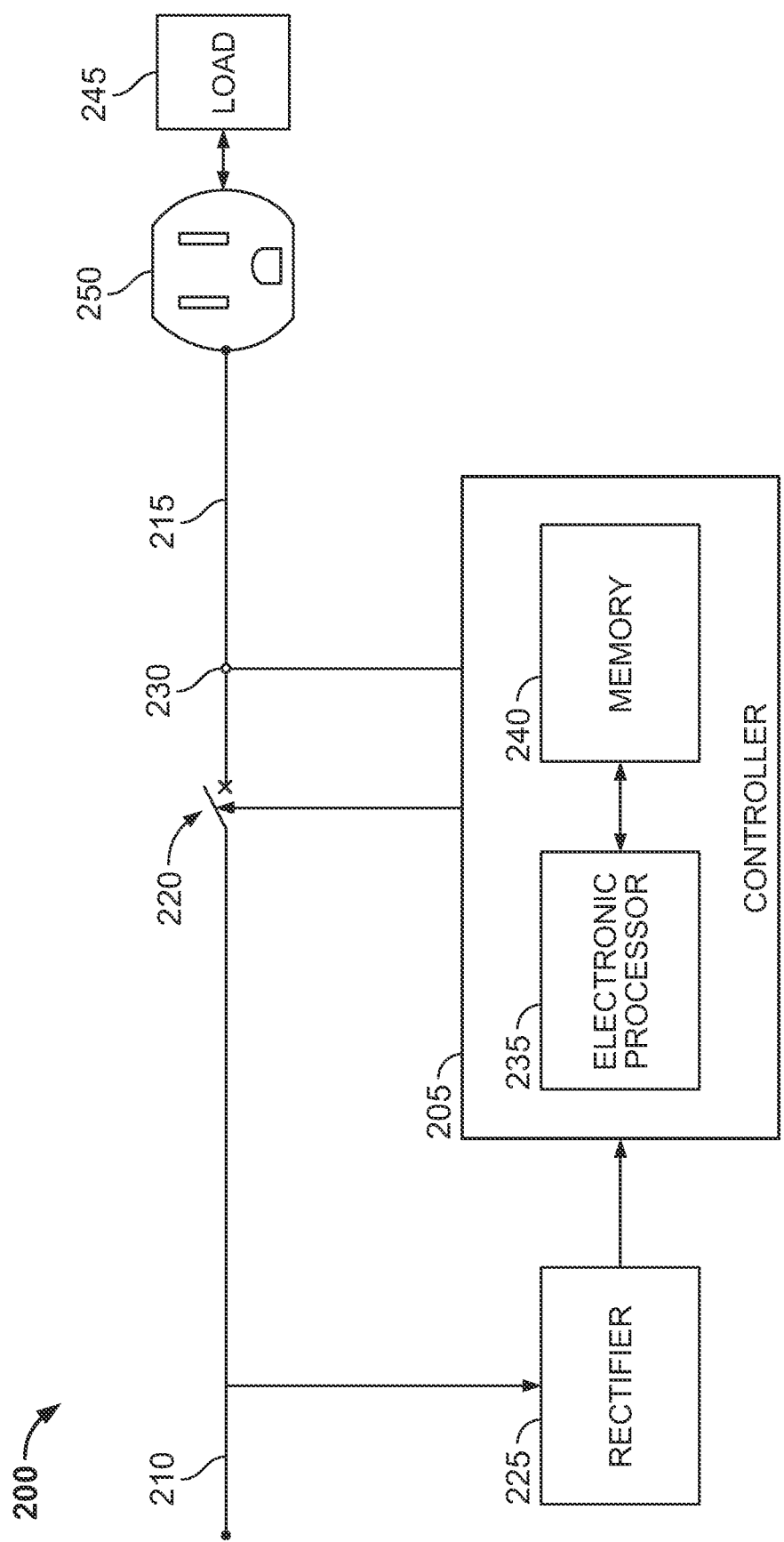
FIG. 4 is a block diagram of a control system of the receptacle of FIG. 1 according to some embodiments.

FIG. 4 is a block diagram of a control system 400 of receptacle 100 according to some embodiments. The control system 400 includes a controller 405. The controller 405 is electrically and/or communicatively connected to a variety of modules or components of the receptacle 100. For example, the controller 405 is connected to a line terminal 410, a load terminal 415, an interrupting device 420, a rectifier 425, and a sensor 430.

In some embodiments, the controller 405 includes a plurality of electrical and electronic components that provide power, operational control, and protection to the components and modules within the controller 405 and/or the receptacle 100. For example, the controller 405 includes, among other things, an electronic processor 435 (for example, a microprocessor or another suitable programmable device) and the memory 440.

The memory 440 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 435 is communicatively coupled to the memory 440 and executes software instructions that are stored in the memory 440, or stored on another non-transitory computer readable medium such as another memory or a disc. The software may include one or more applications, program data, filters, rules, one or more program modules, and other executable instructions.

The line terminal 410 is configured to receive a line power. The line terminal 410 is selectively electrically connected, via the interrupting device 420, to the load terminal 415. The load terminal 415 is configured to output the line power to an external load 445 electrically connected to an outlet 450.

The interrupting device 420 is configured to interrupt the flow of line power from the line terminal 410 to the load terminal 415. In some embodiments, the interrupting device 420 may include components of the core assembly 80, for example line contact arms 94, 96, contacts 102, 104, load contact arms 98, 100, and contacts 101, 103.

Although illustrated as a single line terminal 410, a single load terminal 415, and a single interrupting device 420, in other embodiments, the receptacle 100 may include two or more individually functioning line terminals 410, load terminals 415, and interrupting devices 420. For example, a first line terminal, a first load terminal, and a first interrupting device may correspond to a first outlet of the receptacle 100, while a second line terminal, a second load terminal, and a second interrupting device may correspond to a second outlet of the receptacle 100.

The sensor 430 is configured to sense one or more characteristics of the line terminal 410 and/or load terminal 415. For example, the sensor 430 may sense a voltage, a current, a power, and/or a temperature. Although illustrated as being on the load terminal 415 side, in other embodiments, the sensor 430 may be located on the line terminal 410 side.

In one embodiment of operation, the controller 405 receives a sensed characteristic (for example, current) of the line terminal 410 and/or load terminal 415. The controller 405 analyzes the sensed characteristic (for example, one or more cycles of current) and determines if arcing is occurring. The controller 405 may also determine if one or more conditions are present. For example, the controller 405 may determine if an impulse condition is present, a volatility condition is present, and/or an in-rush condition is present.

Figure 5A:
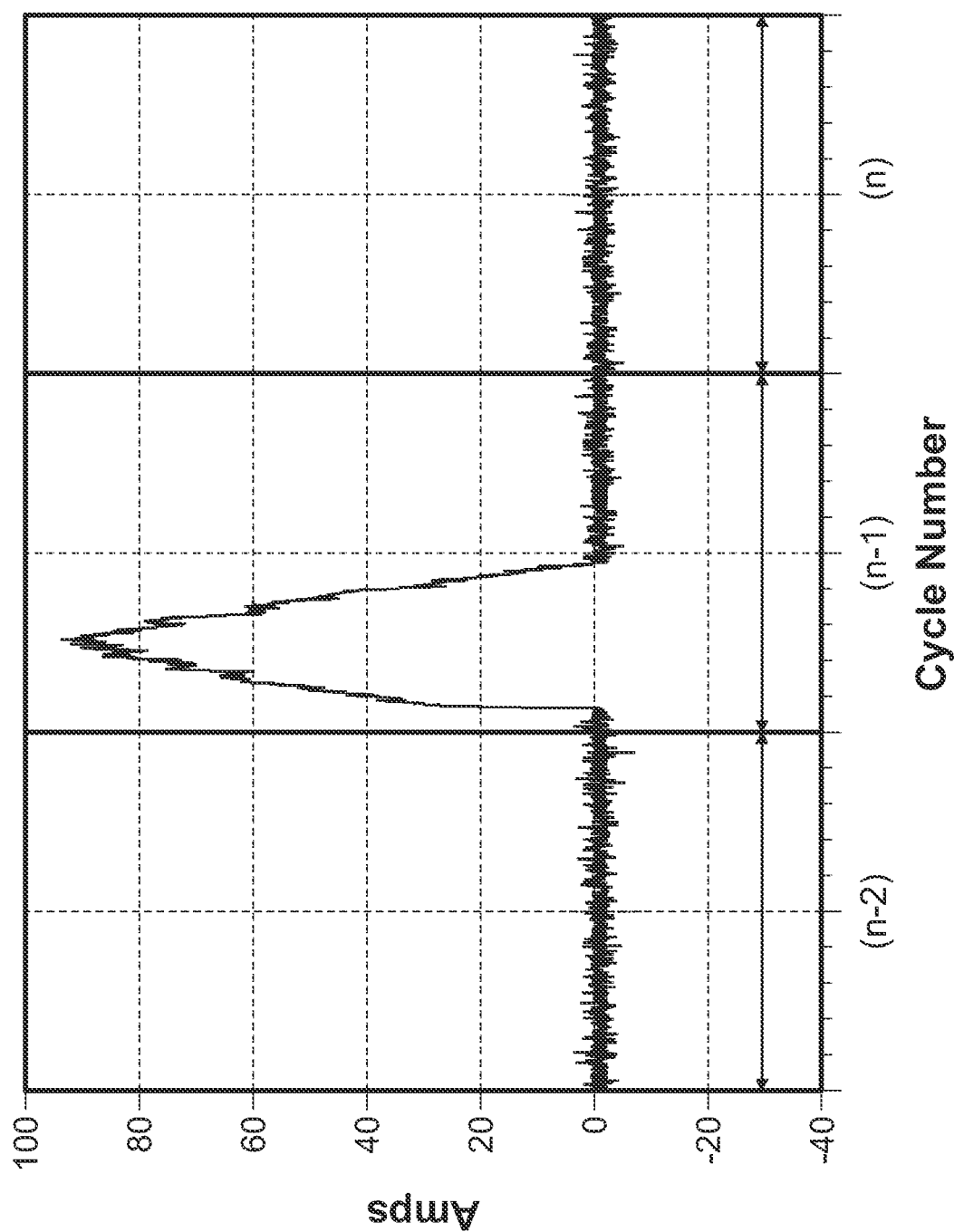
FIGS. 5A & 5B are charts illustrating exemplary impulse conditions of the receptacle of FIG. 1 according to some embodiments.
Figure 5B:
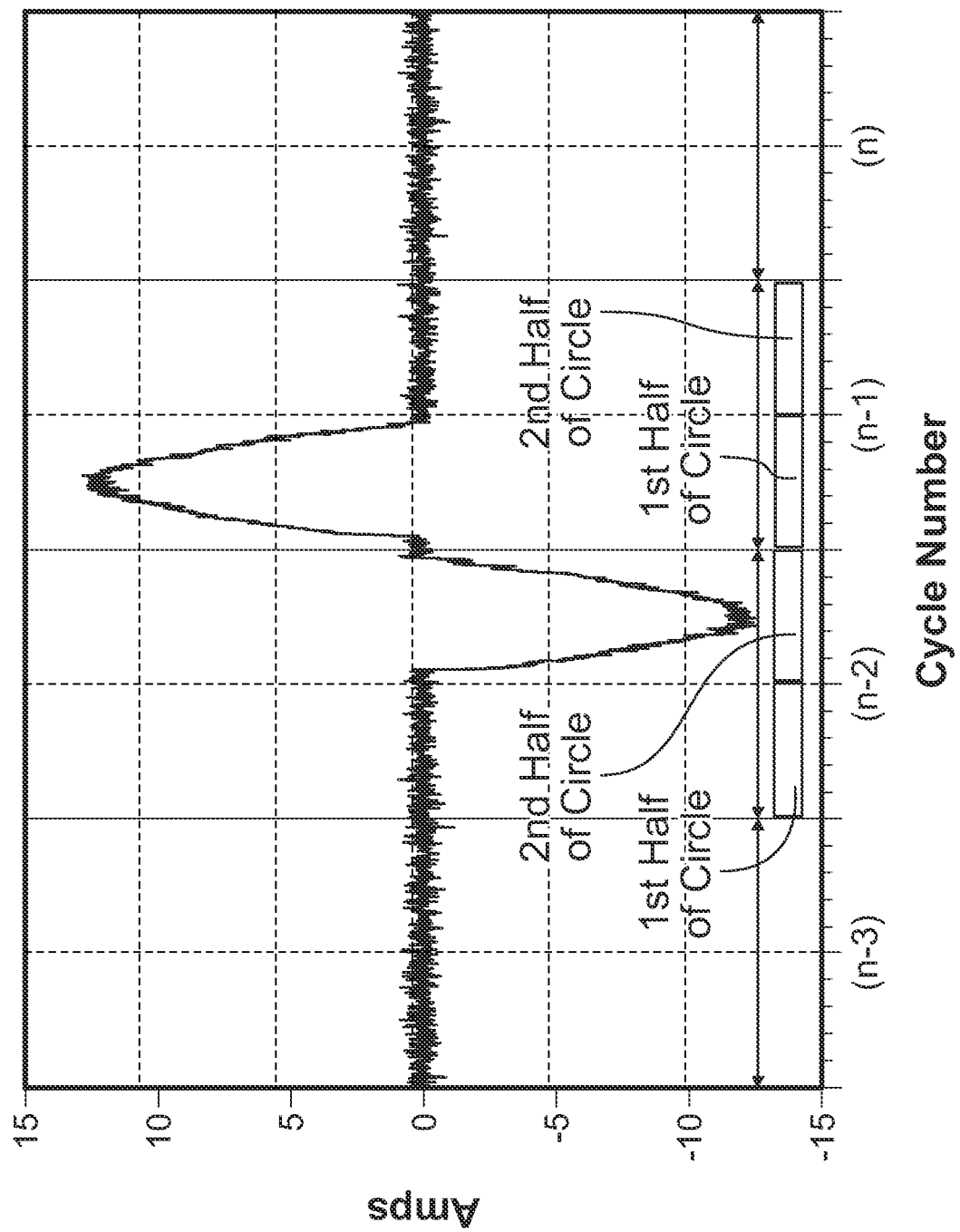

FIGS. 5A & 5B illustrate impulse conditions of a current according to some embodiments. An impulse may be an indication of an arcing condition that takes place over a short period of time (for example, a single cycle). FIG. 5A illustrates a parallel arc generated discontinuity, while FIG. 5B illustrates a series arc generated discontinuity.

Figure 6:
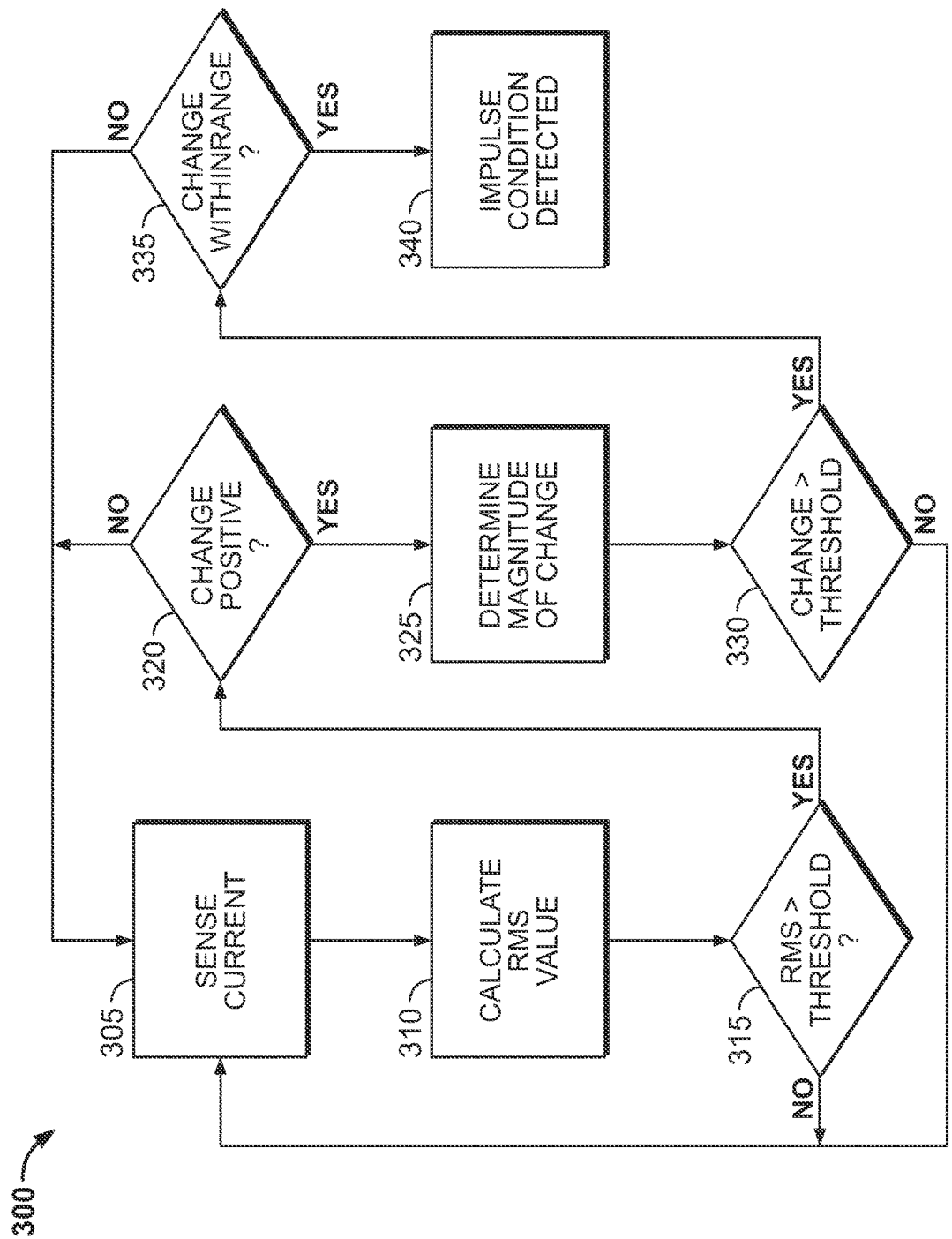
FIG. 6 is a flowchart illustrating a process of the receptacle of FIG. 1 according to some embodiments.

FIG. 6 is a flowchart of a process 500 according to some embodiments. It should be understood that the order of the steps disclosed in process 500 could vary. Furthermore, additional steps may be added to the sequence and not all of the steps may be required. In some embodiments, process 500 is performed by control system 400 and/or controller 405. At block 505, one or more cycles of current (for example, load current and/or line current) are sensed. The root-mean-square (RMS) value of the one or more cycles of current are calculated (block 510). In some embodiments, the RMS value of the one or more cycles of current are calculated by controller 405. The RMS value is compared to a threshold (block 515). In some embodiments, the threshold is approximately 2 Arms to approximately 16 Arms (for example, approximately 3 Arms and/or approximately 15 Arms).

When the RMS value is below the threshold, an impulse condition does not occur and process 500 cycles back to block 505. When the RMS value is above the threshold, a determination is made whether a change in RMS value between a first cycle of the one or more cycles and a second cycle of the one or more cycles is positive (block 520). When the change is negative, an impulse condition does not occur and process 500 cycles back to block 505.

When the change is positive, the magnitude of the change in RMS value is determined (block 525). The magnitude of the change in RMS value is compared to a threshold (block 530). When the magnitude of the change in RMS value is below the threshold, an impulse condition does not occur and process 500 cycles back to block 505. When the magnitude of the change in RMS value is above the threshold, a determination is made whether the change between the second cycle and a third cycle is negative and the magnitude of the change in RMS value between the second cycle and a third cycle is within a range (block 535). In some embodiments, the range is a predetermined percentage range of the change in RMS value between the first cycle and the second cycle. For example, when the change in RMS value between the first cycle and the second cycle is 5 Arms, the change in RMS value between the second cycle and the third cycle must be within 10% of 5 Arms (for example, a range of approximately 4.5 Arms to approximately 5.5 Arms). When the change in RMS value between the second and third cycle is not within the range, an impulse condition does not occur and process 500 cycles back to block 505. When the change in RMS value between the second and third cycles is within the range, the controller 405 determines that arcing is a result of an impulse condition (block 540). In some embodiments, when an impulse condition exists, the flow of line power is interrupted.

Figure 7:
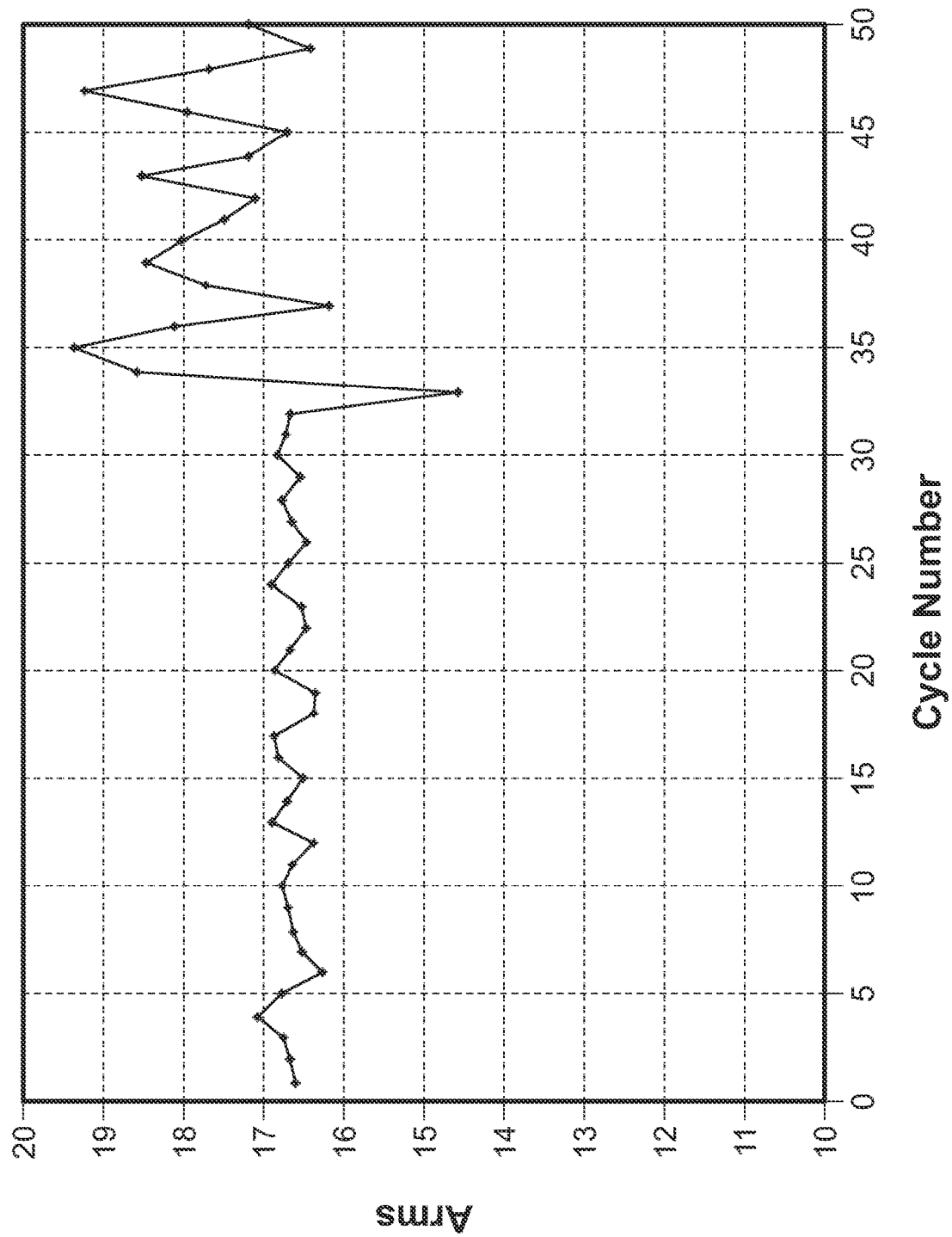
FIG. 7 is a chart illustrating an exemplary volatility condition of the receptacle of FIG. 1 according to some embodiments.

FIG. 7 illustrates a volatility condition of a current according to some embodiments. A volatility condition may be an indication of the presence of arcing. A volatility condition may be present when a minimum number of changes that fall outside an envelope of acceptances, or envelope of acceptable variations, occurs in both positive (increasing) and negative (decreasing) directions.

Figure 8:
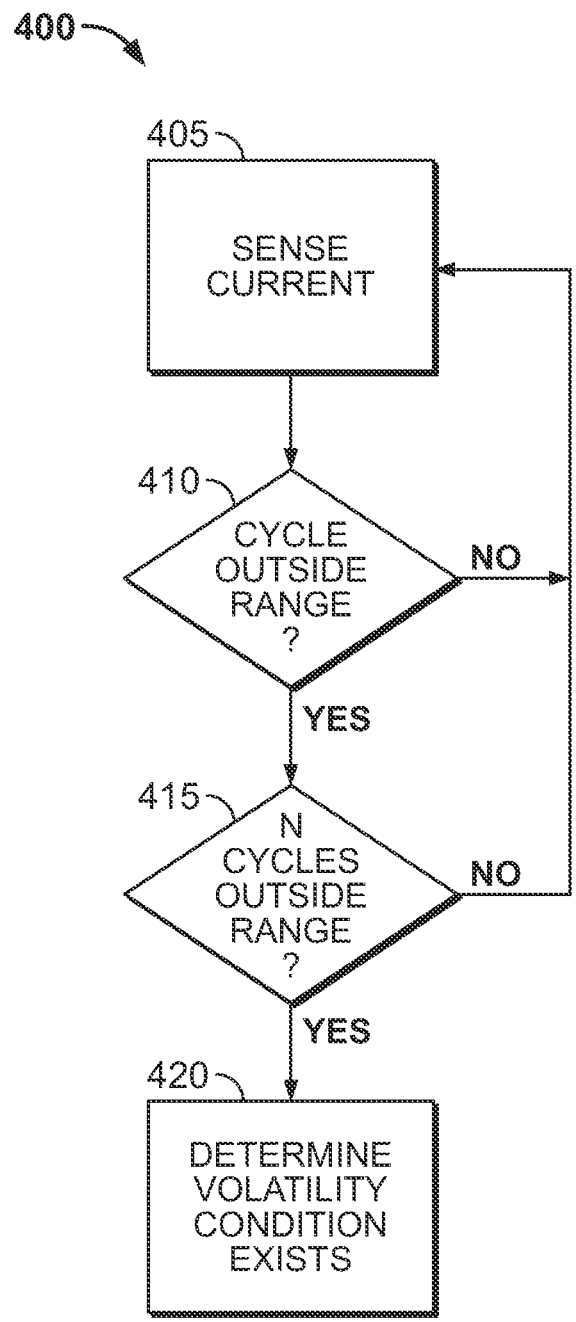
FIG. 8 is a flowchart illustrating a process of the receptacle of FIG. 1 according to some embodiments.

FIG. 8 is a flowchart of a process 550 according to some embodiments. It should be understood that the order of the steps disclosed in process 550 could vary. Furthermore, additional steps may be added to the sequence and not all of the steps may be required. In some embodiments, process 550 is performed by control system 400 and/or controller 405. At block 555, one or more cycles of current (for example, load current and/or line current) are sensed. In some embodiments, an RMS value of the one or more sensed cycles of current are determined. The one or more cycles are compared to a range (block 460). In some embodiments, the range is a range of acceptance. In some embodiments, the range of acceptance is determined based on the current of the previous one or more cycles. In such embodiments, the range of acceptance may be determined based on a variance in RMS value of the current of the previous one or more cycles.

Figure 9:
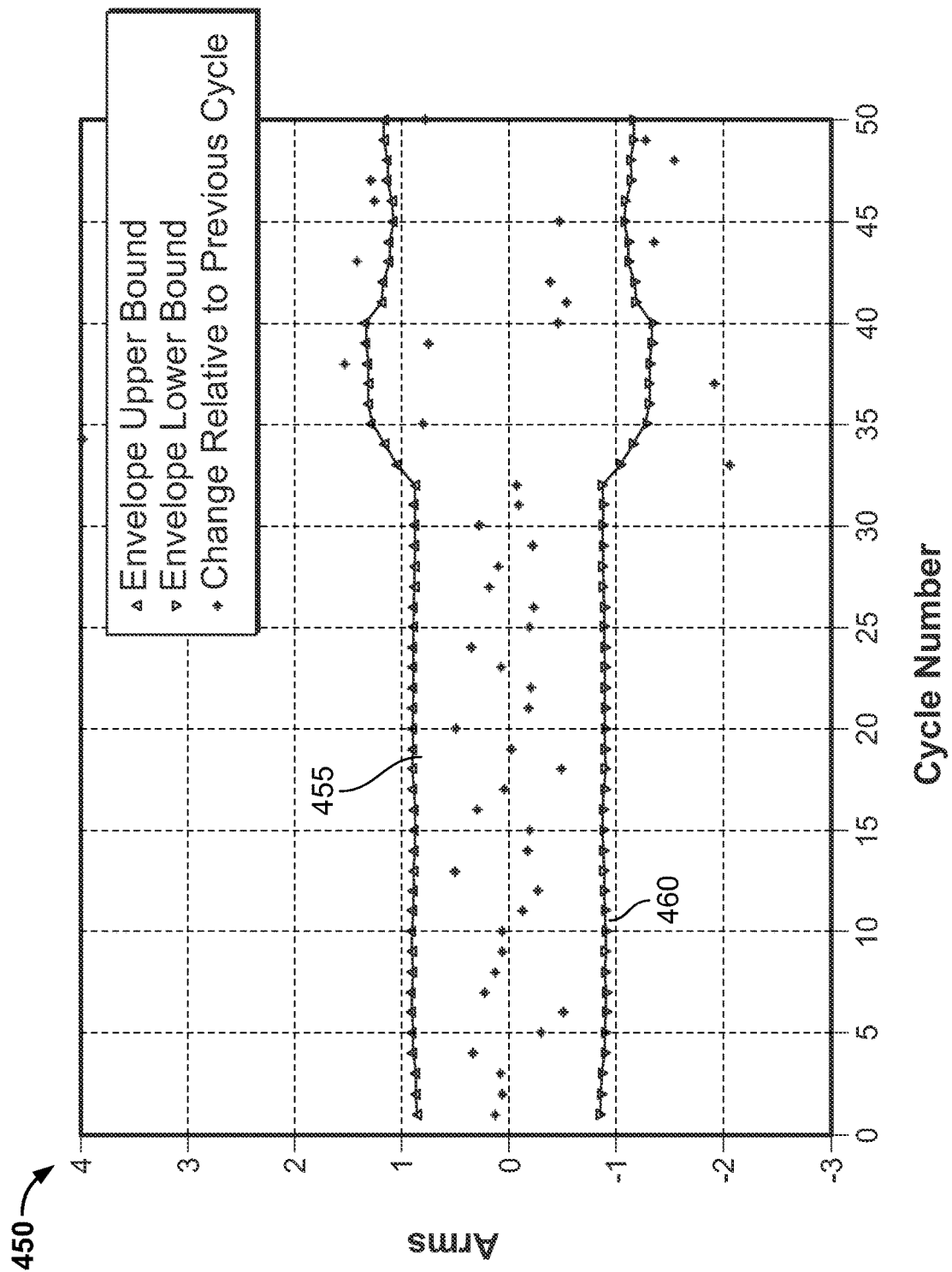
FIG. 9 is a chart illustrating an exemplary acceptable window of detecting a volatility condition of the receptacle of FIG. 1 according to some embodiments.

FIG. 9 illustrates a range of acceptance 650 including an upper limit of acceptance 455 and a lower limit of acceptance 660. As illustrated the upper limit of acceptance 655 and the lower limit of acceptance 660 may vary based on a value of the current of the one or more previous cycles. For example, as illustrated in the example of FIG. 9, the upper limit 655 increases and the lower limit 660 decrease starting at approximately cycle number 33, as a result of RMS value of cycle number 33 and the 7 cycles that precede it.

Returning to FIG. 8, when the one or more cycles are within the range, a volatility condition does not occur and process 550 cycles back to block 555. When one or more cycles are outside the range, a determination is made whether N (for example, three or more) cycles are outside the range (block 565). In some embodiments, block 565 determines if an amount of subsequent cycles are outside the variable range based on the one or more previous cycles. When N cycles are not outside the range, a volatility condition does not occur and process 500 cycles back to block 555. When N cycles are outside the range, the controller 405 determines that arcing is a result of a volatility condition (block 570). In some embodiments, when a volatility condition exists, the flow of line power is interrupted.

Figure 10A:
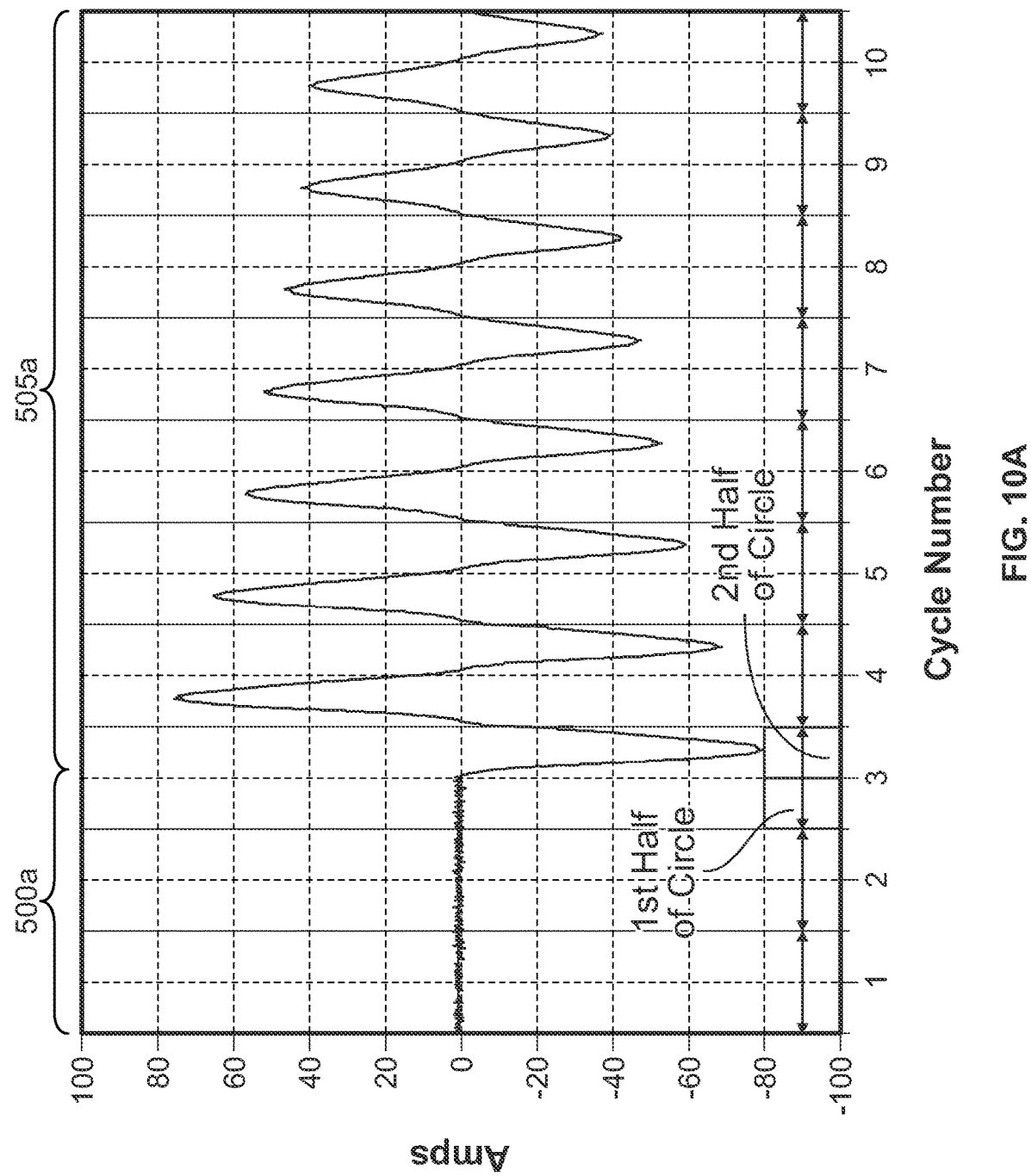
FIGS. 10A & 10B are charts illustrating exemplary in-rush conditions of the receptacle of FIG. 1 according to some embodiments.
Figure 10B:
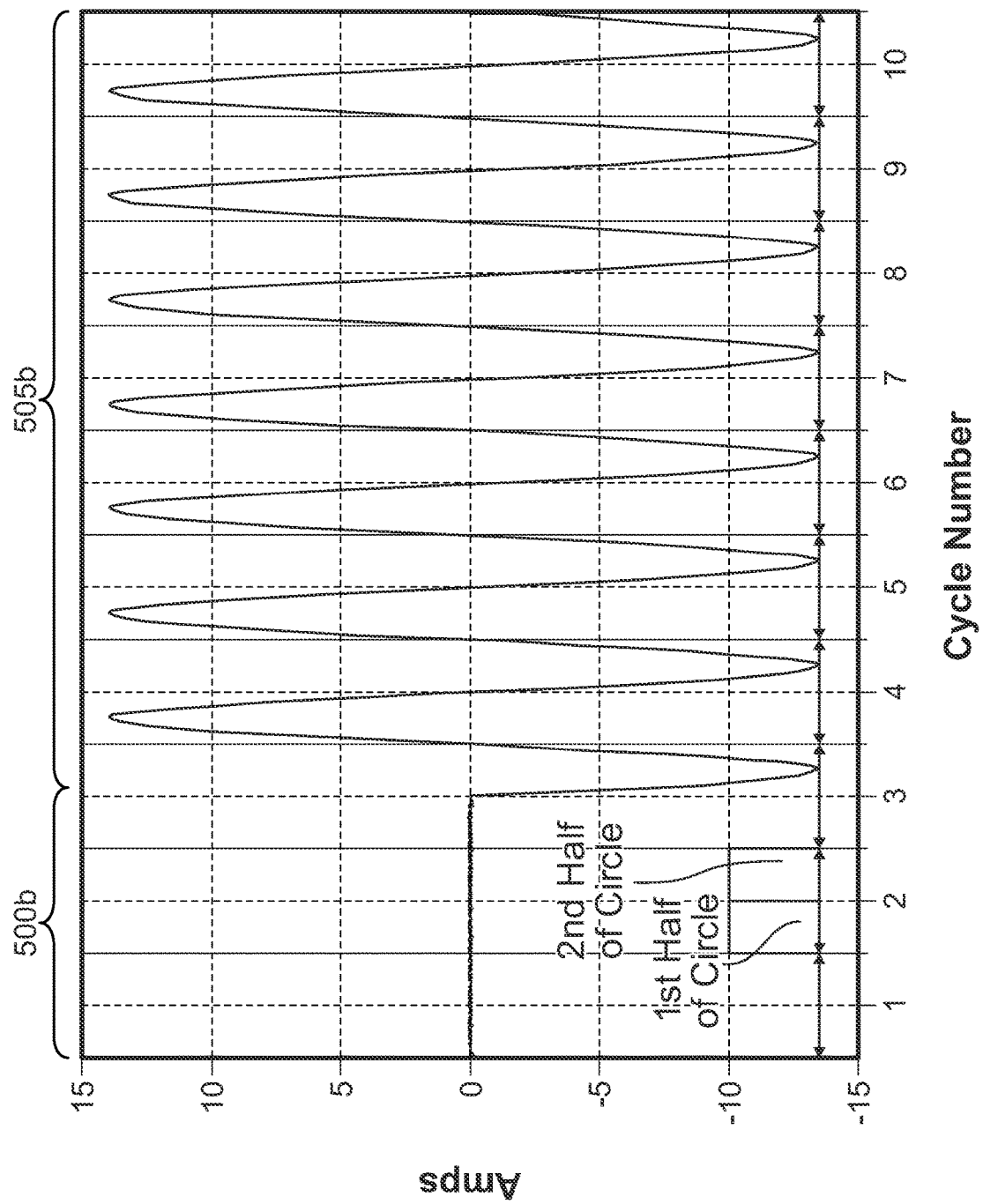

FIGS. 10A and 10B illustrate in-rush conditions of a current according to some embodiments. An in-rush condition may be an indication of the presence of a normally operating load. An in-rush condition may exist when there is a relatively large change in current from an initially non-conductive state, followed by an exponential-like decrease of the current over a plurality of cycles. For example, as illustrated in FIG. 10A, the current is relatively stable (or non-conductive) during time period 700a. Starting at time period 705a, a relatively large change (for example, a magnitude change in current of approximately 80 A) in current occurs, followed by an exponential-like decrease of the current over a plurality of cycles (for example, cycles three to ten).

As illustrated in FIG. 10B, the current (for example, of a resistive load) is relatively stable (or non-conductive) during time period 700b. Starting at time period 705b, a relatively large change (for example, a magnitude change in current of approximately 15 A) in current occurs. An in-rush condition (as illustrated in FIGS. 10A and 10B) may be a normal operating function of the receptacle 100, and therefore interruption of the line power may not be necessary.

Figure 11:
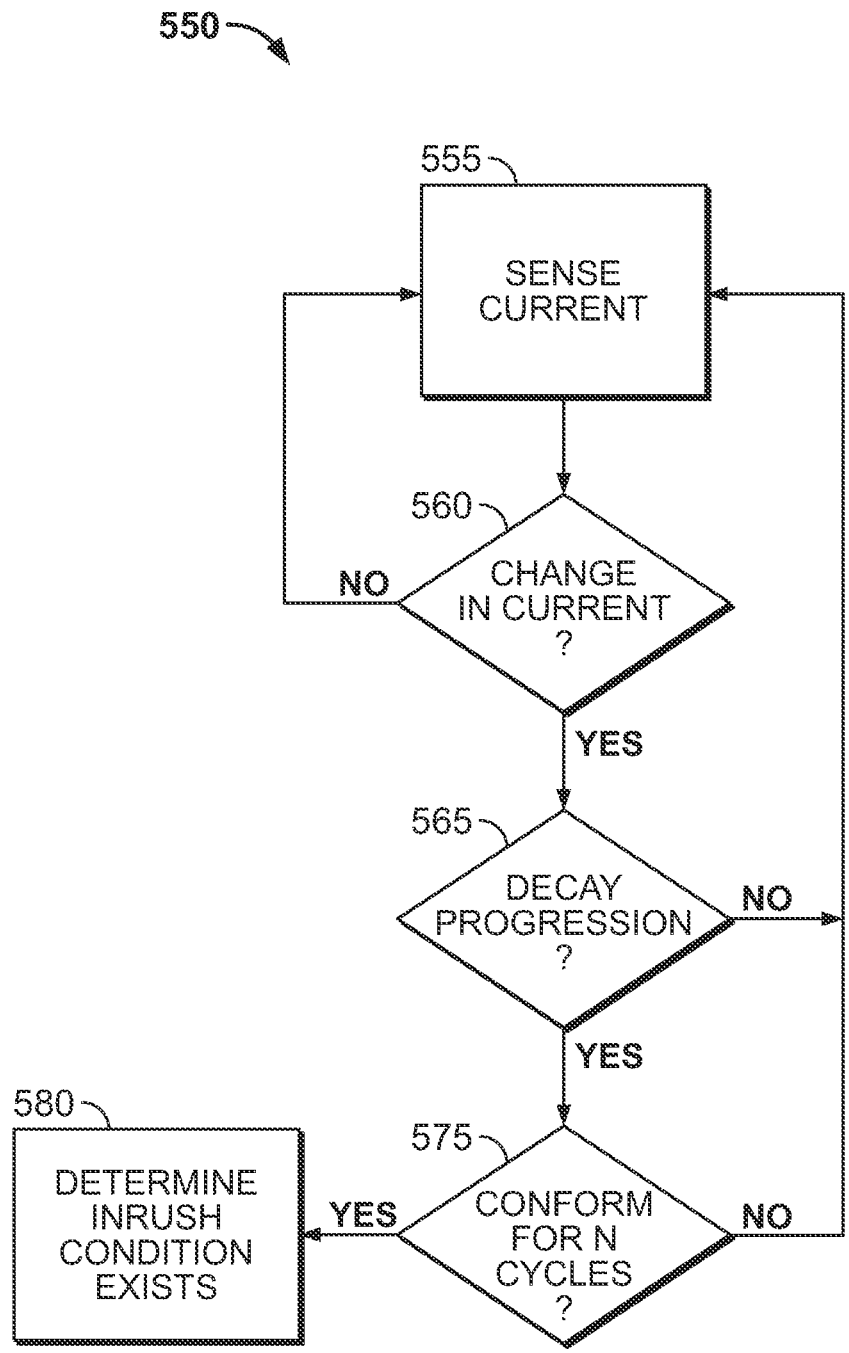
FIG. 11 is a flowchart illustrating a process of the receptacle of FIG. 1 according to some embodiments

FIG. 11 is a flowchart of a process 750 according to some embodiments. It should be understood that the order of the steps disclosed in process 750 could vary. Furthermore, additional steps may be added to the sequence and not all of the steps may be required. In some embodiments, process 750 is performed by control system 400 and/or controller 405. In some embodiments, process 750 is initiated when arcing (or an arc fault condition) is sensed (for example, via controller 405). At block 755, one or more cycles of current (for example, load current and/or line current) are sensed. In some embodiments, an RMS value of the one or more sensed cycles of current are determined. The one or more cycles (for example, the RMS value of the one or more cycles) are analyzed to determine if there has been a large (for example, 20 A or greater) change in current from a first cycle (n) to a second cycle (n+1) (block 760). In some embodiments, the change of current is measured using the RMS value of the current. If there has not been a change, process 750 cycles back to block 755.

If there has been a relatively large change in current, a determination is made whether a change between the second cycle (n+1) and the third cycle (n+2) conforms to a decay progression (block 765) (for example, as illustrated in FIG. 10A). In some embodiments, the decay progression is based on the current value of the immediate predecessor cycle. For example, to comply with the decay progression, the amplitude of a cycle (for example, the third cycle) may be within a range of percentages (for example, a range of approximately 80% to approximately 90%) of the amplitude of the previous cycle (for example, the second cycle).

If the change does not conform to the decay progression, an in-rush condition does not exist and process 750 returns to block 755. If the change conforms to the decay progression, the controller 405 determines if the decay progression has been conformed to for N cycles (block 775). In some embodiments, N cycles is greater than one.

If the decay progression has not been conformed to for N cycles, an in-rush condition does not exist and process 750 returns to block 755. In some embodiments, if arcing is detected via other means (for example, via detection of correlation, impulse, and/or volatility), the flow of power may be interrupted. If the decay progression has been conformed to for N cycles, the controller 405 determines that an in-rush condition exists (block 780). In some embodiments, when an in-rush condition exists, interruption of the flow of line power is prohibited.

In some embodiments, rather than monitoring for a decay progression, an in-rush condition may be determined based on the RMS current staying within one or more predetermined amplitude boundaries (or a decay progression envelope) after a relatively large change in current occurs (for example, as illustrated in FIG. 10B). In some embodiments, the decay progression envelope defines sets of upper and lower limit pairs (expressed in ratio form), which are specific to the position of each cycle in the sequence that occur subsequent to the initial cycle following the relatively large change in current. The RMS values may conform with the decay progression envelope by falling between the upper and lower limit pair specific to the cycle's position in the sequence as multiplied by the RMS value of the cycle's immediate predecessor. If substantially all cycles within the sequence conform to the decay progression envelope, an in-rush condition may be recognized and any arc faults that may have been identified erroneously during the sequence may be ignored.

Figure 12:
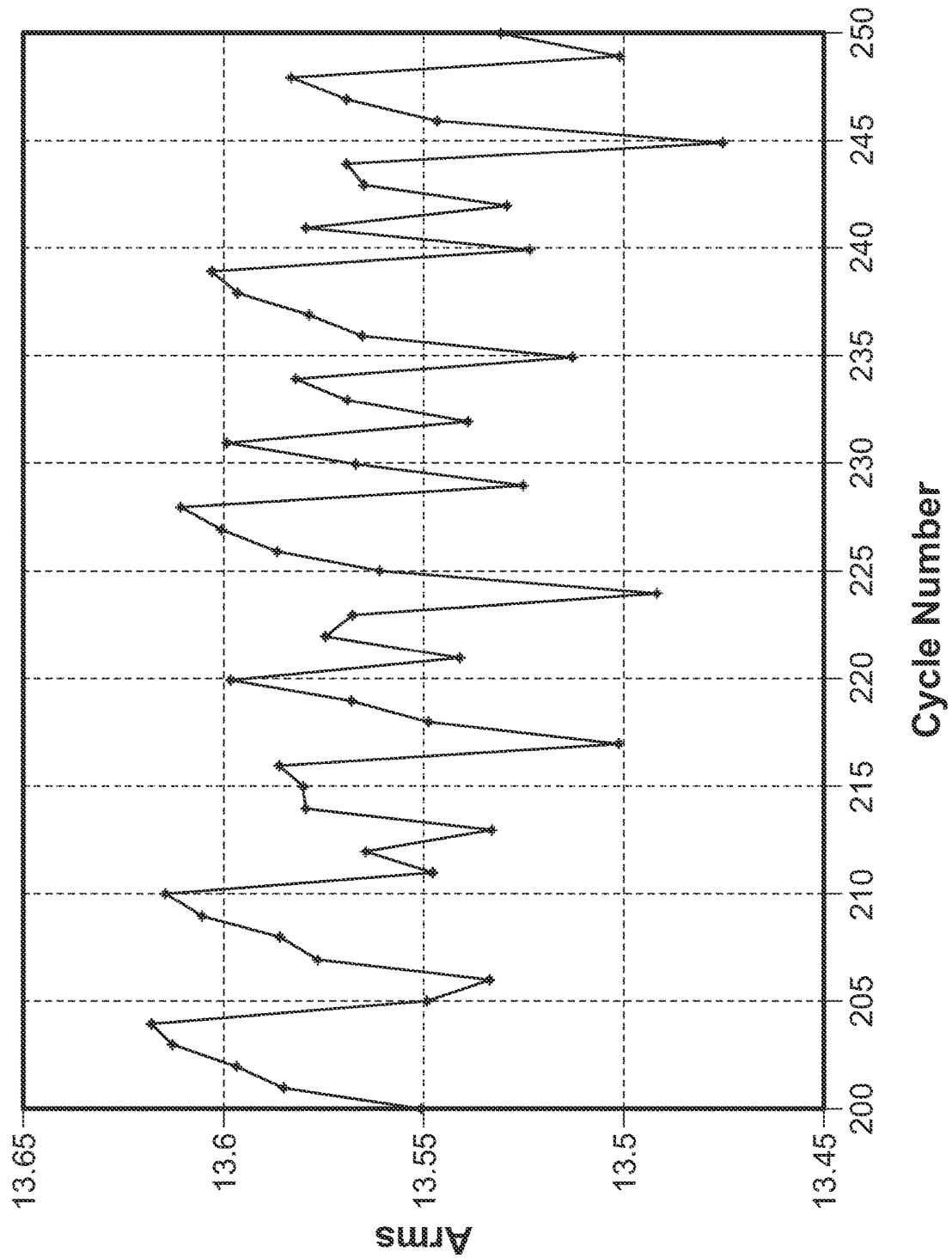
FIG. 12 is a chart illustrating an exemplary steady-state condition of the receptacle of FIG. 1 according to some embodiments.

FIG. 12 illustrates a steady-state condition of a current according to some embodiments. A steady-state condition may be an indication of the presence of a normally operating load. A steady-state condition may exist where there is a relatively small variation in current (for example, a variation that is within +/−0.5-Arms) for a plurality of cycles (for example, fifteen) and/or the relative change in the correlation coefficient calculated between contiguous cycles falls within an envelope of acceptance for each cycle within a plurality of cycles (for example, fifteen).

Figure 13:
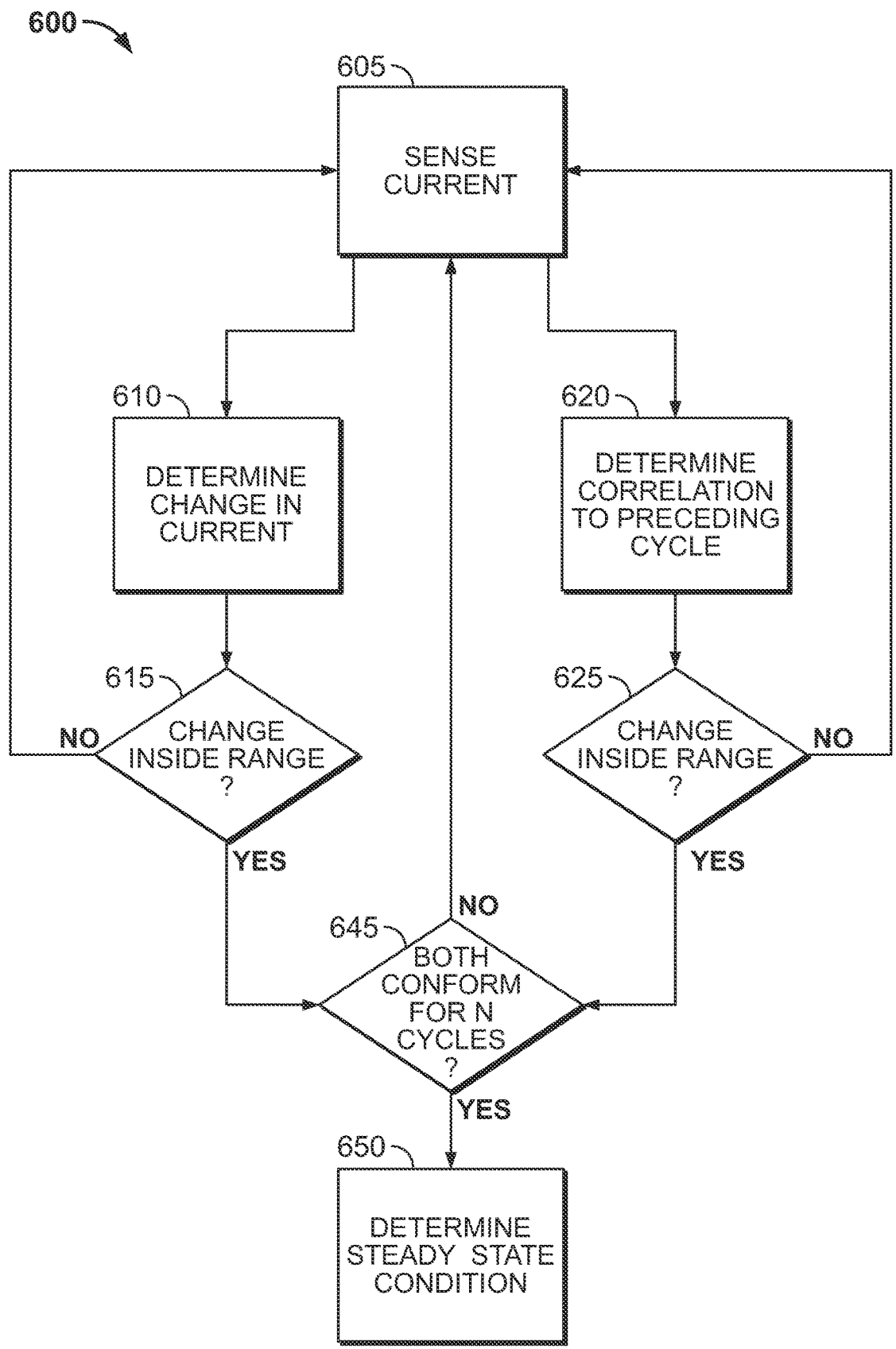
FIG. 13 is a flowchart illustrating a process of the receptacle of FIG. 1 according to some embodiments.

FIG. 13 is a flowchart of a process 900 according to some embodiments. It should be understood that the order of the steps disclosed in process 900 could vary. Furthermore, additional steps may be added to the sequence and not all of the steps may be required. In some embodiments, process 900 is performed by control system 400 and/or controller 405. At block 905, one or more cycles of current (for example, load current and/or line current) are sensed. In some embodiments, an RMS value of the one or more cycles of current are determined. The one or more cycles (for example, the RMS value of the one or more cycles) are analyzed (block 910) to determine if the change in current from a first cycle (n) to a second cycle (n+1) (block 915) is within a variation limit or range (for example, 0.5-Arms). Likewise, in some embodiments, the degree of correlation (for example, the correlation coefficient), between contiguous members of the set of one or more cycles of current are determined (block 920). The one or more cycles (for example, the correlation coefficients of adjacent cycles) are analyzed to determine if the change in correlation coefficient value between a first cycle (n) relative to a second cycle (n+1), and a second cycle (n+1) relative to a third cycle (n+2) (block 925) lies within a range. In some embodiments, the range is a range of acceptance. In some embodiments, the range of acceptance may be determined based on a variance in correlation coefficient value of the preceding one or more cycles of current.

Figure 14:
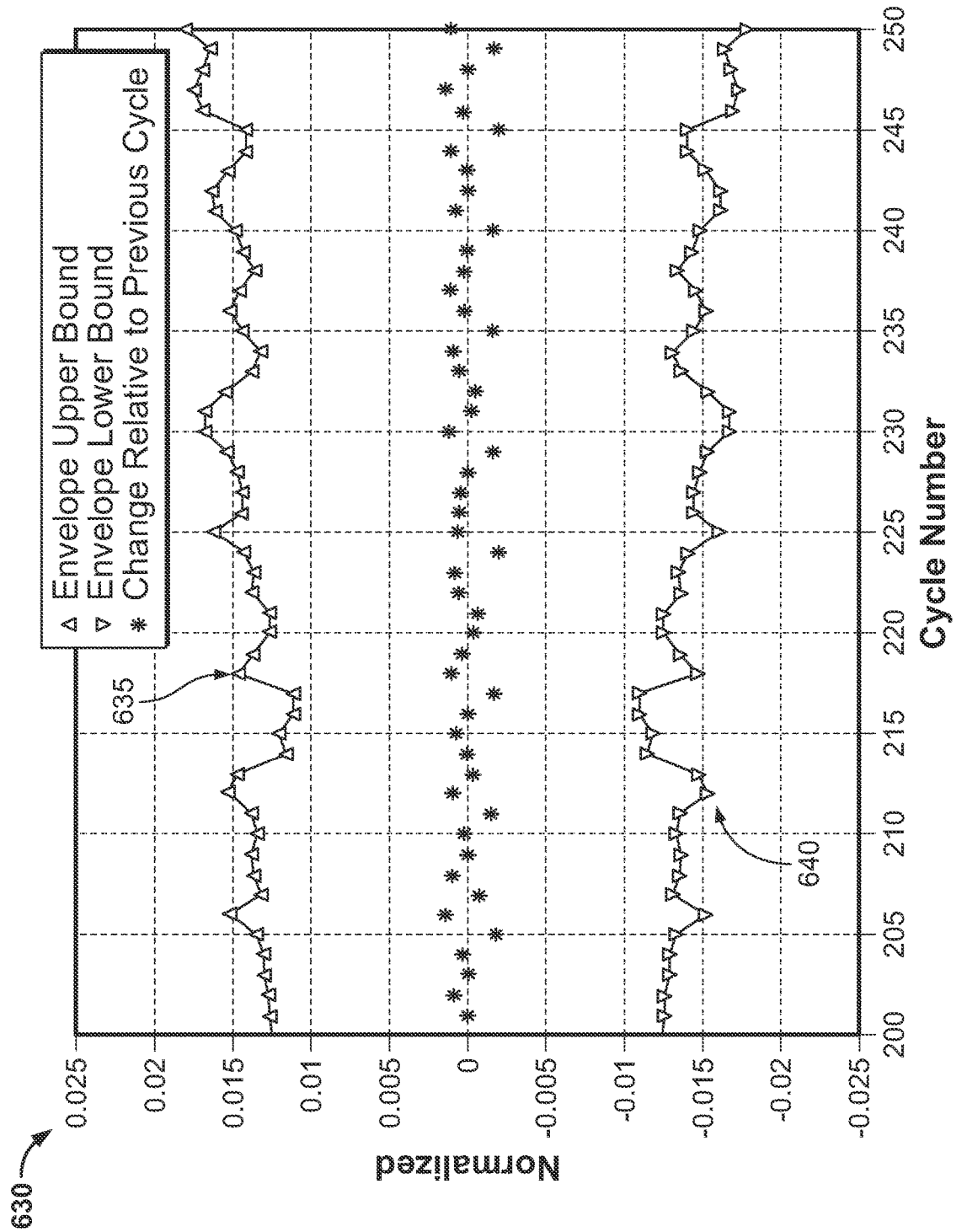
FIG. 14 is a chart illustrating an exemplary acceptable window for detecting a steady-state condition of the receptacle of FIG. 1 according to some embodiments.

FIG. 14 illustrates a range of acceptance 1030 including an upper limit of acceptance 1035 and a lower limit of acceptance 1040. As illustrated the upper limit of acceptance 1035 and the lower limit of acceptance 1040 may vary based on the variance in the degree of correlation between contiguous members of the set of one or more previous cycles. For example, as illustrated in the example of FIG. 14, the upper limit 1035 increases and the lower limit 1040 decreases starting at approximately cycle number 225, as a result of the degree of correlation of cycle 225 relative to cycle 224 and the correlation coefficients of the 14 pairs of adjacent cycles that precede cycle 225.

Returning to FIG. 13, when the change in RMS value is outside the range of allowable variation, a steady-state condition does not occur and process 900 cycles back to block 905. Likewise, when the change in correlation coefficient value is outside the range of acceptance, a steady-state condition does not occur and process 900 cycles back to block 905. When one or more cycles demonstrate that the change in RMS value is within the allowable range of variation, and the change in correlation coefficient value is within the range of acceptance, a determination is made whether N (for example, fifteen) cycles conform to both sets of range requirements (block 945). When fewer than N cycles conform, a steady-state condition does not exist and process 1900 cycles back to block 905. When N cycles conform to both sets of range requirements, the controller 405 determines that a steady-state condition exists and any arc faults that are identified erroneously while the steady-state condition persists are ignored (block 950).

Figure 15:
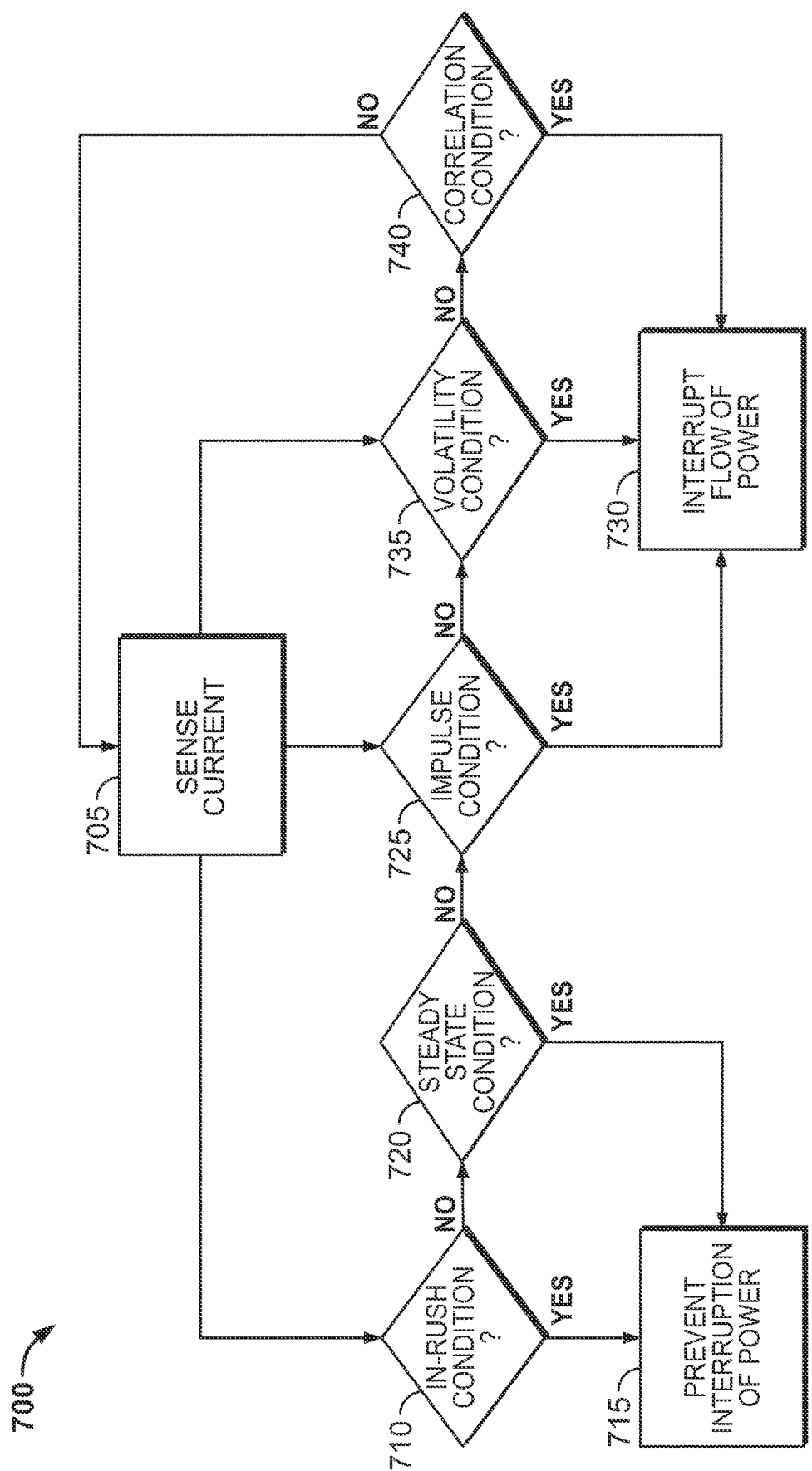
FIG. 15 is a flowchart illustrating a process of the receptacle of FIG. 1 according to some embodiments

FIG. 15 is a flowchart of a process 1100 according to some embodiments. It should be understood that the order of the steps disclosed in process 1100 could vary. Furthermore, additional steps may be added to the sequence and not all of the steps may be required. In some embodiments, process 1100 is performed by control system 400 and/or controller 405. At block 1105, one or more cycles of current (for example, load current and/or line current) are sensed. The controller 405 determines if an in-rush condition is detected (block 1110). If an in-rush condition is detected, interruption of power is prevented (block 1115). If an in-rush condition is not detected, the controller 405 determines if a steady-state condition exists (block 1120). If a steady-state condition exists, interruption of power is prevented (block 1115).

If an in-rush condition is not detected and a steady-state condition does not exist, the controller 405 determines if an impulse condition exists (block 1125). If an impulse condition exists, the flow of power is interrupted (block 1130). If an impulse condition does not exist, the controller 405 determines if a volatility condition exists (block 1135). If a volatility condition exists, the flow of power is interrupted (block 1130). If a volatility condition does not exist, the controller 405 determines if a correlation condition exists (block 1140). If a correlation condition exists, the flow of power is interrupted (block 1130). If a correlation condition does not exist, process 1100 cycles back to block 1105.

Thus, embodiments described above provide, among other things, a system and method for preventing unwanted trips from occurring in a receptacle (for example, a GFCI and/or AFCI receptacle), as well as tripping the receptacle in response to one or more arc conditions being present. Various features and advantages of the application are set forth in the following claims.

What is claimed is:

1. A wiring device comprising:
   an interrupting device electrically connecting one or more line terminals to one or more load terminals when the interrupting device is in a reset condition and disconnecting the line terminals from the load terminals when the interrupting device is in a tripped condition; and
   a controller having an electronic processor and a memory, the controller configured to
      monitor a current of the one or more line terminals,
      identify a presence of an in-rush condition, wherein an in-rush of the current exists when the one or more cycles of current conform with a decay progression envelope, wherein conforming with the decay progression envelope includes falling between an upper and lower limit pair specific to the cycle's position in sequence, and
      prevent the tripped condition upon identifying the in-rush condition.

2. The wiring device of claim 1, wherein the tripped condition is prevented for a predetermined time period upon identifying the in-rush condition.

3. A wiring device comprising:
   an interrupting device electrically connecting one or more line terminals to one or more load terminals when the interrupting device is in a reset condition and disconnecting the line terminals from the load terminals when the interrupting device is in a tripped condition; and
   a controller having an electronic processor and a memory, the controller configured to
      monitor a current of the one or more line terminals,
      identify a presence of a steady-state condition, wherein a steady-state of the current exists when the one or more cycles of current conform to both a range of allowable variation in RMS value and an envelope of acceptable variation in correlation coefficient value, and
      prevent the tripped condition upon identifying the steady-state condition.

4. The wiring device of claim 3, wherein the tripped condition is prevented for a predetermined time period upon identifying the steady-state condition.

5. A wiring device comprising:
   an interrupting device electrically connecting one or more line terminals to one or more load terminals when the interrupting device is in a reset condition and disconnecting the line terminals from the load terminals when the interrupting device is in a tripped condition; and
   a controller having an electronic processor and a memory, the controller configured to
      monitor a current of the one or more line terminals,
      identify a presence of an impulse condition, wherein the impulse condition is identified by determining a root-mean-square (RMS) value of at least one cycle of the current of the one or more line terminals, and
      place the interrupting device in the tripped condition upon identifying the impulse condition;
   wherein the impulse condition is further identified by determining when the RMS value of at least one cycle of current has crossed a threshold, and a magnitude of change in a RMS value between a first cycle of the current and a second cycle of the current is positive and greater than a second threshold, and wherein when the magnitude of change is negative, an impulse condition is determined to not occur.

6. A wiring device comprising:
   an interrupting device electrically connecting one or more line terminals to one or more load terminals when the interrupting device is in a reset condition and disconnecting the line terminals from the load terminals when the interrupting device is in a tripped condition; and
   a controller having an electronic processor and a memory, the controller configured to
      monitor a current of the one or more line terminals,
      identify a presence of a volatility condition, wherein the volatility condition is identified by determining a root-mean-square (RMS) value of at least one cycle of the current of the one or more line terminals, and
      place the interrupting device in the tripped condition upon identifying the volatility condition;
   wherein the volatility condition is further identified by determining when the RMS value of at least one cycle of current has crossed a threshold, and a magnitude of change in a RMS value between a first cycle of the current and a second cycle of the current is greater than a second threshold, and wherein the range of acceptance is determined from the magnitude of change in RMS value of the current of the previous one or more cycles.

7. The wiring device of claim 6, wherein the volatility condition is identified by the controller further being configured to:
   determine a volatility of the current exists when a magnitude of change in current from a first cycle to a second cycle falls outside a range of acceptance.

* * * * *